(12) United States Patent
Maizlish et al.

(10) Patent No.: US 9,769,751 B2
(45) Date of Patent: Sep. 19, 2017

(54) LINK AND MESSAGE MANAGEMENT IMPROVEMENTS

(71) Applicant: DSP Group LTD., Herzeliya (IL)

(72) Inventors: Oleg Maizlish, Herzliya (IL); Ido Achrak, Rosh Haayin (IL)

(73) Assignee: DSP GROUP LTD., Herzliya (IL)

( * ) Notice: Subject to any disclaimer, the term of this patent is extended or adjusted under 35 U.S.C. 154(b) by 241 days.

(21) Appl. No.: 14/298,983

(22) Filed: Jun. 9, 2014

(65) Prior Publication Data
US 2015/0139052 A1    May 21, 2015

Related U.S. Application Data

(60) Provisional application No. 61/906,444, filed on Nov. 20, 2013.

(51) Int. Cl.
*H04W 4/12* (2009.01)
*H04W 52/02* (2009.01)
*H04W 72/12* (2009.01)

(52) U.S. Cl.
CPC ......... *H04W 52/0216* (2013.01); *H04W 4/12* (2013.01); *H04W 52/0209* (2013.01); *H04W 72/121* (2013.01); *Y02B 60/50* (2013.01)

(58) Field of Classification Search
CPC .. H04W 4/12–4/14; H04W 52/0203–52/0258; H04W 72/12–72/121; H04W 72/1257; H04W 72/1278–72/1289; H04W 74/08–74/0858
See application file for complete search history.

(56) References Cited

U.S. PATENT DOCUMENTS

| 2009/0279474 | A1* | 11/2009 | Chou | H04B 7/155 370/315 |
| 2014/0094170 | A1* | 4/2014 | Kilian | H04M 1/727 455/435.1 |
| 2015/0245292 | A1* | 8/2015 | Jeong | H04W 52/0222 370/311 |
| 2016/0157158 | A1* | 6/2016 | Jeong | H04W 48/20 370/315 |

\* cited by examiner

*Primary Examiner* — Eric Myers
(74) *Attorney, Agent, or Firm* — Reches Patents

(57) ABSTRACT

A method for transferring messages to wireless communication device, the method may include receiving, by an intermediate device, from a upstream device, a certain message awaiting indication that is indicative that a certain message is waiting to be sent to a certain wireless communication device; detecting, by the intermediate device, that the certain wireless communication device is in a wireless communication facilitating mode; requesting the certain wireless communication device, to re-enter the wireless communication facilitating mode at a certain time frame; retrieving the certain message from the upstream device; detecting, by the intermediate device, that the certain wireless communication device re-entered the wireless communication facilitating mode at the certain time frame; and wirelessly transmitting the certain message to the certain wireless communication device.

22 Claims, 6 Drawing Sheets

LINK AND MESSAGE MANAGEMENT IMPROVEMENTS

RELATED APPLICATIONS

This invention claims priority from U.S. provisional patent Ser. No. 61/906,444 and filing date Nov. 20, 2013 which is incorporated herein by reference.

FIELD OF THE INVENTION

This invention relates to the field of local area networks.

BACKGROUND TO THE INVENTION

In a local area network based upon IEEE 802.11 stations can enter a power save state. When in a power save state, the station (STA) will wake up in order to receive a beacon from the network controller; an access point (AP) in the case of an infrastructure network or group owner (GO) in the case of Wi-Fi Direct. Generally when a STA is in the power save state and sleeping, the AP or GO buffers packets for that STA and then indicates in the beacon if there are buffered packets for that STA. By waking up for beacons, the STA can then determine if there are buffered packets for it and can then retrieve them. In newer schemes for devices that sleep for long periods the STA may wake and contact the AP without waiting for a beacon.

In a local area network based upon DECT Ultra Low Energy (ULE) as per ETSI TS 102 939-1, the network generally consists of a DECT ULE Base Station (BS) and several DECT ULE devices (UDs). The UD is generally a battery powered device that is intended to sleep for long periods. When the UD wakes, it needs to first synchronize with the BS and then can either send data to the BS or simply send a single null data packet in order to pull any data from the BS that is intended for the UD.

In both of the examples given above, the network controller, FP (Fixed Part), i.e. the AP or BS, must buffer any packets intended for any and all of the sleeping clients, PP (Portable Part), i.e. STA or UD, until the client wakes and contacts it. The message or messages for one or more PPs is sent to the FP from an application that is either local on the distribution system or remote over the internet, for example. Therefore the controller must have the capacity to store all of the messages that are for sleeping clients until each client wakes and contacts the controller. In networks where there are a large number of clients, the controller requires more and more memory capacity. Hence, in networks that consist of many sensor or activator devices, such as is found in security, control, energy management, telemetry, etc. the number of clients can be large and the amount of storage high. Some controllers, such as a DECT ULE Base Station or a small or 'soft' AP are not usually designed to have high storage. In addition, the traffic for the clients can often be very intermittent with sudden spikes in activity as, for example, when all the clients are required to be re-configured or particular data is required from many devices within a short time span. It is difficult to estimate the message sizes, the distribution of the messages or the time required to store the messages. All this requires a 'worse case' estimate and hence potentially large, expensive storage. Another potential problem is that if many clients contact the controller within a short period, then they compete and each needs to stay awake until they receive their data. This can be inefficient as the wake time on average for each client is increased as each must wait until other clients are first serviced. Furthermore, if the network is shared with clients that have higher throughput requirements, then the air time consumed by the sleeping client waking up for messages and data can become significant and reduce the overall capacity of the network.

There is a growing need to reduce the buffering of many messages in the controller and to reduce the time that clients need to be awake, thereby improving the efficiency of the network and the power consumption of the devices.

SUMMARY OF THE INVENTION

There are provided methods, non-transitory computer readable media and wireless communication devices.

According to an embodiment of the invention there is provided a method for transferring messages to wireless communication device, the method may include receiving, by an intermediate device, from a upstream device, a certain message awaiting indication that is indicative that a certain message is waiting to be sent to a certain wireless communication device; detecting, by the intermediate device, that the certain wireless communication device is in a wireless communication facilitating mode; requesting the certain wireless communication device, to re-enter the wireless communication facilitating mode at a certain time frame; retrieving the certain message from the upstream device; detecting, by the intermediate device, that the certain wireless communication device re-entered the wireless communication facilitating mode at the certain time frame; and wirelessly transmitting the certain message to the certain wireless communication device.

The intermediate device may be an access point or a group owner and wherein the upstream device is an application controller.

The intermediate device may be a Digital Enhanced Cordless Telecommunication Ultra Low Energy (DECT ULE) base station.

The intermediate device may be a Digital Enhanced Cordless Telecommunication (DECT) base station.

The requesting of the certain wireless communication device to re-enter the wireless communication facilitating mode occurs at a requesting point of time; wherein the method may include determining a time gap between the requesting point of time and the certain time frame in response to an expected duration of the retrieving of the certain message from the upstream device.

The method further may include receiving from the upstream device an availability indication that is indicative of a time period during which the upstream device is available for receiving messages from a wireless communication device; and sending to the certain wireless communication information about an availability of the upstream device.

The method may include determining the certain time frame during which the certain wireless communication device is requested to re-enter the wireless communication facilitating mode in response to at least one other time frame during which at least one other wireless communication device is requested to re-enter the wireless communication facilitating mode. This may result in distributing the awakening times of different wireless communication devices.

The method may include determining the certain time frame during which the certain wireless communication device is requested to re-enter the wireless communication facilitating mode in response to an actual or expected traffic load on a network that comprises the certain wireless communication device. Heavier traffic may require better spreading of awakening times of different wireless communication devices.

According to an embodiment of the invention there is provided a method for transferring messages to wireless communication device, the method may include: receiving, by an intermediate device, from at least one upstream device, multiple message awaiting indications that are indicative that multiple messages are waiting to be sent to a plurality of wireless communication devices; repeating, for each of the plurality of wireless communication device the stages of: detecting, by the intermediate device, that the wireless communication device is in a wireless communication facilitating mode; requesting the wireless communication device, to re-enter the wireless communication facilitating mode at one or more future time frames that are associated with the wireless communication device; retrieving from the at least one upstream device one or more messages of the multiple messages that are waiting to be sent to the wireless communication device; detecting, by the intermediate device, that the wireless communication device re-entered the wireless communication facilitating mode at the one or more future time frame associated with the wireless communication device; and wirelessly transmitting the one or more messages to the certain wireless communication device.

The at least one future time frame may be utilized for transmitting a single message to a single wireless communication device.

The at least one future time frame may be utilized for transmitting more than a single message to a single wireless communication device.

The method may include buffering up to a single message per wireless communication device at the intermediate device.

The method may include buffering more than a single message for a wireless communication device at the intermediate device.

The method may include associating different time frames to different wireless communication devices.

The method may include associating non-overlapping time frames to different wireless communication devices.

The method may include applying a traffic flow control rule to determine an association between time frames and wireless communication devices.

The method may include determining an association between time frames and wireless communication devices according to a traffic balancing scheme.

The method may include receiving from the upstream device an availability indication that is indicative of a time period during which the upstream device is available for receiving messages from one or more wireless communication device; and sending to at least one of the plurality of wireless communication device information about an availability of the upstream device.

According to an embodiment of the invention there is provided a non-transitory computer readable medium that stores instructions that once executed by an intermediate device cause the intermediate device to: receive from a upstream device, a certain message awaiting indication that is indicative that a certain message is waiting to be sent to a certain wireless communication device; detect that the certain wireless communication device is in a wireless communication facilitating mode; request the wireless communication device to re-enter the wireless communication facilitating mode at a certain time frame; retrieve the certain message from the upstream device; detect that the certain wireless communication device re-entered the wireless communication facilitating mode at the certain time frame; and wirelessly transmit the certain message to the certain wireless communication device.

According to an embodiment of the invention there is provided a non-transitory computer readable medium that stores instructions that once executed by an intermediate device cause the intermediate device to: receive from at least one upstream device, multiple message awaiting indications that are indicative that multiple messages are waiting to be sent to a plurality of wireless communication devices; repeating, for each of the plurality of wireless communication device the stages of: detecting, by the intermediate device, that the wireless communication device is in a wireless communication facilitating mode; requesting the wireless communication device, to re-enter the wireless communication facilitating mode at one or more future time frames that are associated with the wireless communication device; retrieving from the at least one upstream device one or more messages of the multiple messages that are waiting to be sent to the wireless communication device; detecting, by the intermediate device, that the wireless communication device re-entered the wireless communication facilitating mode at the one or more future time frame associated with the wireless communication device; and wirelessly transmitting the one or more messages to the certain wireless communication device.

According to an embodiment of the invention there is provided an intermediate device that may include a communication interface and a controller; wherein the interface is arranged to receive from a upstream device, a certain message awaiting indication that is indicative that a certain message is waiting to be sent to a certain wireless communication device; wherein the controller is arranged to detect that the certain wireless communication device is in a wireless communication facilitating mode; wherein the interface is arranged to request the certain wireless communication device, to re-enter the wireless communication facilitating mode at a certain time frame and to retrieve the certain message from the upstream device; wherein the controller is arranged to detect that the certain wireless communication device re-entered the wireless communication facilitating mode at the certain time frame; and wherein the interface is arranged to wirelessly transmit the certain message to the certain wireless communication device.

According to an embodiment of the invention there is provided an intermediate device that may include a communication interface and a controller; wherein the interface is arranged to receive from at least one upstream device, multiple message awaiting indications that are indicative that multiple messages are waiting to be sent to a plurality of wireless communication devices; wherein the intermediate device is arranged to repeat, for each of the plurality of wireless communication device the stages of: detecting, by the controller, that the wireless communication device is in a wireless communication facilitating mode; request, by the interface, the wireless communication device, to re-enter the wireless communication facilitating mode at one or more future time frames that are associated with the wireless communication device; retrieve, by the interface and from the at least one upstream device one or more messages of the multiple messages that are waiting to be sent to the wireless communication device; detect, by the controller that the wireless communication device re-entered the wireless communication facilitating mode at the one or more future time frame associated with the wireless communication device;

and wirelessly transmitting, by the interface, the one or more messages to the certain wireless communication device.

BRIEF DESCRIPTION OF DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF THE INVENTION

Figure 1:
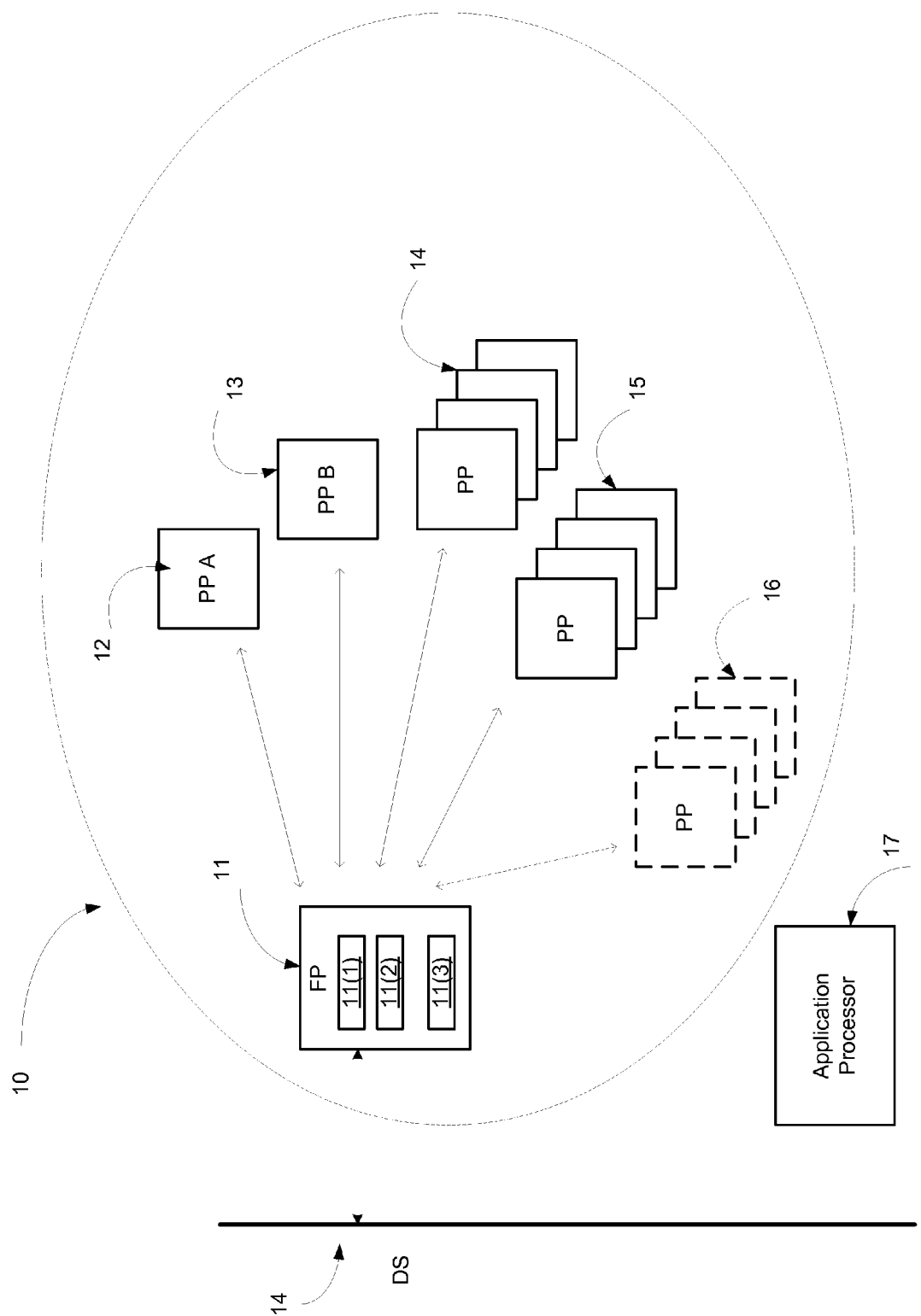
FIG. 1 is schematic diagram of a local area network showing the FP, PPs and application controller according to an embodiment of the invention.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

The following description refers to fixed points, portable points and application processors. These are only examples of an intermediate communication device, wireless communication devices and an upstream device. The upstream device may be a source of messages that is positioned upstream to the wireless communication device that is the target of the messages. The intermediate communication device is positioned in the path between the upstream device and the target of the messages. It is noted that the PP may be stationary (for example fixed sensors) and the fixed point can be portable.

The following description refers to various modes of operation of PPs such as a sleep mode and an awake mode. These modes are only examples of multiple possible modes that differ from each other by power consumption and the ability of the PP to communicate. The PP can operate at more than two different operational modes that differ by power consumption and communication capability. For example, a PP can enter and exit a wireless communication facilitating mode in which the PP can wirelessly communicate. This mode can be regarded as an awake mode. The wireless communication facilitating mode may be associated with higher power consumption than another mode that does not facilitate communication (a wireless communication non-facilitating mode) such as a sleep mode.

In place of the complete messages from an application intended for PPs being sent to the FP for buffering and delivery, the application sends only a short message that informs the FP that there is a message for a particular PP. The FP stores that simple information. When a PP wakes and contacts the FP, the FP indicates that there is a message for the PP and tells the FP to go back to sleep and to wake either at a set time or after a certain time period has elapsed. At this point the PP will go back to sleep and the FP contacts the application to retrieve the complete message. At the allotted time the PP will wake, contact the FP and the message is delivered.

In the case that the application informs the FP of messages for more than one PP, the FP will allocate the delay times for each PP to contact the FP, such that the FP need only store one message for delivery at a time. To demonstrate this, a simple example is given as follows:

FP receives an indication of a message for PP A from the application processor.

FP receives an indication of a message for PP B from the application processor

PP B wakes and contacts the FP. The FP tells PP B to wake again in T1 seconds

FP retrieves message for PP B from application processor

PP A wakes and contacts FP. FP tells PP A to wake again in T2 seconds, where T2 is such that there is time for PP B to wake and the message be transmitted to it, before PP A will re-awake.

PP B wakes and FP delivers message

FP retrieves message for PP A from application processor

PP A wakes and the FP delivers message

As can be seen from this simple example, the FP, by setting the time for a PP to re-awaken can ensure that it only need store one message at a time. Depending upon the capacity of the FP it can, of course, decide to collect more than one message from the application at any one time. For example when PP A wakes and contacts FP in the example above, the FP could decide to retrieve the message for PP A before delivering the message to PP B. In this case it would buffer two messages at the same time.

It is noted that the FP can arrange the air time using the "wake again in time T" instruction so as to spread out the times that the PPs are awake and hence control contention. Similarly it can use this feature so as to reduce the interference to other higher traffic devices that may be on the network. If the traffic is high then the sleeping PPs can be organized so as to be more spread out in their wake times. Hence the latency of this system can be controlled within practical requirements. In the case that the message traffic grows, the latency gracefully extends.

An extension to this scheme is the case that the application processor is unable to accept messages from PPs, via the FP. Under these circumstances the applications processor can send a message to the FP indicating that it is 'busy' and not able to accept messages. The applications processor may also include in the message a time when it should be available, "estimated time of availability (ETA)". This ETA could be an absolute time or a relative time. If and when a PP contacts the FP with a message for the applications processor, the FP will reply with a 'busy' response, and, if the application processor provided the ETA, the FP can convey this time information to the PP such that the PP knows when it may try again.

FIG. 1 is a schematic drawing of a local area network, 10, including of a an intermediate communication device such as Fixed Part (FP), 11, and a plethora of wireless communication devices such as Portable Parts (PP), 12, 13, 14, 15, 16.

FP 11 is illustrated as including an interface 11(1) for receiving and transmitting messages, indications and the like, controller 11(2) and a buffer 11(3). Buffer 11(3) is for buffering messages. Buffer 11(3) may be included in the interface or coupled to it. The controller 11(2) is arranged to control the operations of the FP 11. The controller may be a general purpose processor, a digital signals processor, a dedicate hardware or any type of processor. The controller may be arranged to execute instructions that once executed cause it to perform any of the methods illustrated in this specification.

Two PPs are shown individually, PP A, 12, and PP B, 13. Clusters of PPs, 14, 15, and 16, are included to show that the network can have many PPs. In the network of interest PPs 12, 13 and 14 are low throughput battery devices that sleep for long periods, whereas PPs, 15 and 16 may be devices that sleep for, say, shorter periods or indeed are higher traffic devices. The number of PPs 14 in this example is intended to be a high number. The FP, 11, is connected to the Distribution System (DS) 14 to which the Application Processor 17 is also connected. The application processor may be connected locally to the DS 14 or remotely, via, for example, the internet. The network 10 may be, for example, an IEEE 802.11 network or a DECT ULE network. In the former case the FP, 11, would be an Access Point (AP) and the PPs, 12-16, would be stations (STAs) associated to the AP. In the latter case, the FP, 11, would be a DECT ULE Base Station (BS) and the PPs, 12 to 16, would be DECT ULE devices that synchronize to the BS.

In the network, 10, as described, PPs, 12, 13, and 14 are low data rate, battery powered devices with long sleep times. PPs will wake at different times and contact the FP. Any messages for any PP will originate at the Application Processor, 17. The time distribution and sizes of these messages is unknown and may vary considerably and if the FP, 11, had to store and buffer all of them until contacted by the individual PPs then the buffering capacity at the FP may become excessive and a 'worse case' scenario would need to be accounted for.

Figure 2:
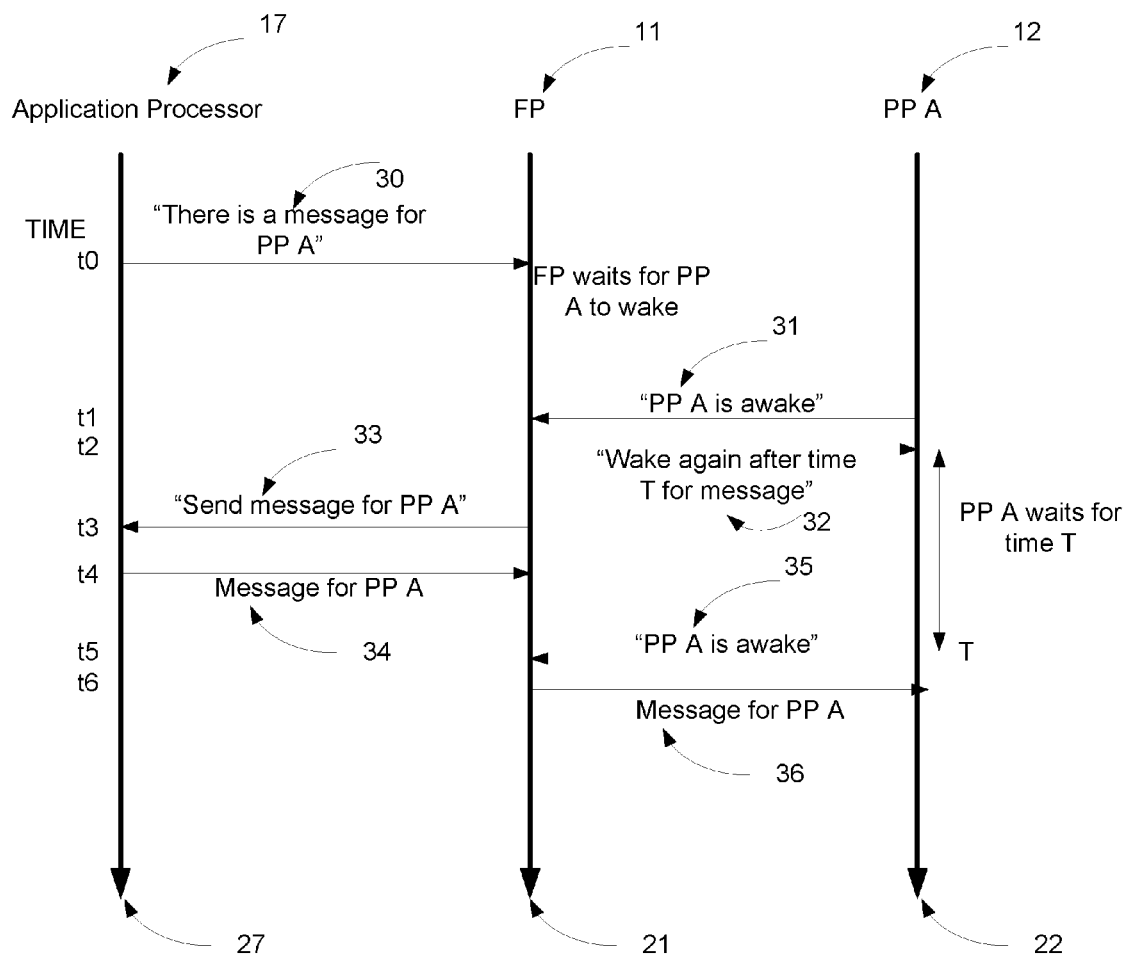
FIG. 2 is a time diagram of the interchanges between the application, FP and a single PP according to an embodiment of the invention.

FIG. 2 is a time line diagram that illustrates the steps to send a message originating at the Application Processor 17 to PP A 12. In FIG. 2 the time lines for the Application Processor 17, the FP 11 and PP A 12, are 27, 21 and 22 respectively. The specific time points referred to in this description are shown on the Application Processor time line 27.

At time t0 the Application Processor 17 sends a short control message 30 to the FP 11. This control message 30 informs the FP 11 that there is a message at the Applications Processor 17 that is intended for PP A 12.

Having noted this control message 30 the FP 11 will then wait until PP A 12 wakes and contacts the FP 11.

At time t1, PP A 12 wakes and contacts the FP 11. In this example the control message 31 is a simple null data packet transfer to inform the FP that PP A is awake.

The FP 11 immediately sends a control message (command) 32, at time t2, to PP A 12 with the instruction that it should contact the FP 11 again after a time T has elapsed. Optionally this command could indicate a set time in the future rather than an elapsed time.

PP A 12 will then go back into sleep mode.

The FP 11 then sends a control message (command) 33 to the Applications Processor 17 at time t3. This command 33 instructs the Applications Processor 17 to send the message intended for PP A 12.

The Applications Processor 17 duly sends the message 34 at time t4.

The FP 11 will then buffer the message waiting for PP A to wake.

After time T has elapsed since time t2, PP A 12 wakes at time t5 and contacts the FP 11 with control message 35 informing the FP 11 that PP A 12 is now awake again.

At time t6 the FP 11 sends the message 36 to PP A 12. Message 36 contains the message information intended for PP A 12 contained in message 34 that was sent from the Applications Processor 17 to the FP 11.

FIG. 2 describes the basic message flow of this invention. In practice it should be expected that more than one message for a PP may be required at any one time.

It is assumed that the message 34 that is aimed to the wireless communication device is much longer than the control messages 30, 31, 32, 33, 35. The control messages are also referred to as commands, notifications or indications. Message 34 can be any combination of bits, bytes or symbols.

Figure 3:
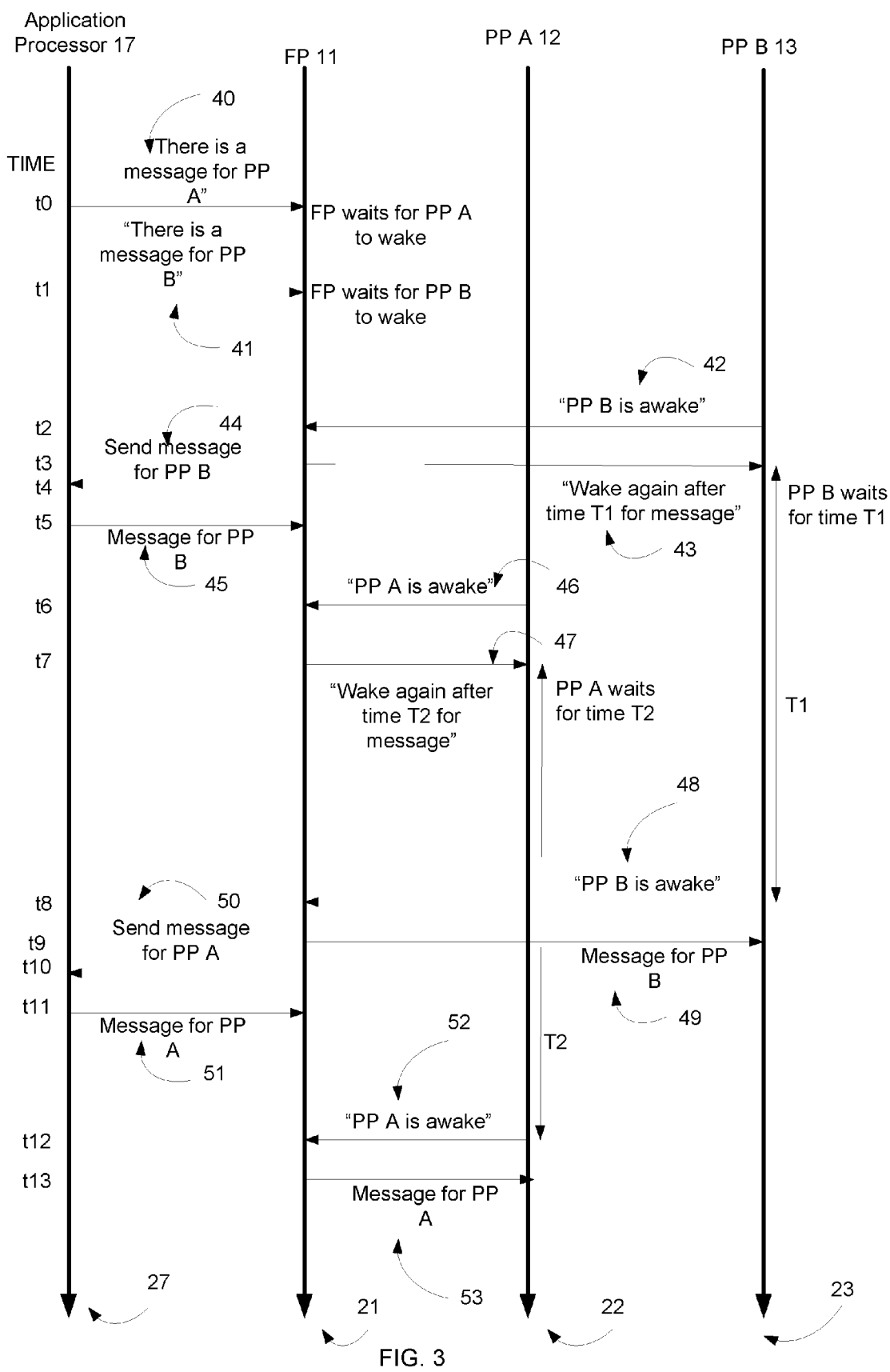
FIG. 3 is a time diagram of the interchanges between the application, the FP and two PPs according to an embodiment of the invention.

FIG. 3 is a time line diagram that illustrates the steps to send messages originating at the Application Processor 17 to PP A 12 and to PP B 13. In FIG. 3 the time axis for the Application Processor 17, the FP 11, PP A 12 and PP B 13 are 27, 21, 22 and 23 respectively. The specific time points referred to in this description are shown on the Application Processor time line 27.

At time t0 the Application Processor 17 sends a short control message 40 to the FP 11. This control message 40 informs the FP 11 that there is a message at the Applications Processor 17 that is intended for PP A 12. Having noted this control message 40 the FP 11 will then wait until PP A 12 wakes and contacts the FP 11.

At time t1 the Application Processor 17 sends another short control message 41 to the FP 11. This control message 41 informs the FP 11 that there is a message at the Applications Processor 17 that is intended for PP B 13.

Having noted this message 41 the FP 11 will then wait until PP B 13 wakes and contacts the FP 11.

At time t2 PP B 13 wakes and contacts the FP 11. In this example the control message 42 is a simple packet null data transfer to inform the FP that PP B is awake. The FP 11 immediately sends a control message (command) 43, at time t3, to PP B 13 that it should contact the FP 11 again after a time of T1 has elapsed. Optionally this command could indicate a set time in the future rather than an elapsed time.

PP B 13 will then go back into sleep mode.

The FP 11 then sends a control message (command) 44 to the Applications Processor 17 at time t4. This control message (command) 44 instructs the Applications Processor 17 to send the message intended for PP B 13.

The Applications Processor 17 duly sends the message 45 at time t5. The FP 11 will then buffer the message waiting for PP B to wake.

In this example the next event is at time t6; PP A 12 wakes and contacts the FP 11 with control message 46.

The FP 11 immediately sends a control message (command) 47, at time t7, to PP A 13 that it should contact the FP 11 again after a time of T2 has elapsed.

Optionally this command could indicate a set time in the future rather than an elapsed time.

PP B 13 will then go back into sleep mode.

Note that the FP 11 is already buffering the message for PP B 13 so the FP can set the time T2 such that PP A 12 will wake after PP B 13 has woken and there has been enough time for the message to be transmitted from the FT 11 to PP B 13.

After T1 seconds has elapsed since time t3, PP B 13 wakes at time t8 and contacts the FP 11 with control message 48 informing the FP 11 that PP B 13 is now awake again.

At time t9 the FP 11 sends the message 49 to PP B 13. Message 49 contains the message information intended for PP B 13 contained in message 45 that was sent from the Applications Processor 17 to the FP 11 at time t5.

At this point, time t10, the FP 11 sends control message (command) 50 to the Applications Processor 17. This control message (command) 50 instructs the Applications Processor 17 to send the message intended for PP A 12.

The Applications Processor 17 duly sends the message 51 at time t11 to the FP 11. The FP 11 will then buffer the message waiting for PP A 12 to wake.

After T2 seconds has elapsed since time t7, PP A 12 wakes at time t12 and contacts the FP 11 with control message 52 informing the FP 11 that PP A 12 is now awake again.

At time t13 the FP 11 sends the message 53 to PP A 12. Message 53 contains the message information intended for PP A 12 contained in message 51 that was sent from the Applications Processor 17 to the FP 11.

The example illustrated in FIG. 3 demonstrates that the FP need only buffer a single message for one PP at a time, even when there are many PPs in the network. Although the example shows only two PPs, it should be clear that this can be expanded to many PPs. By instructing a PP to wake again at a set time in the future, the FP can ensure that it has time to retrieve the desired messages, one at a time, from the Applications Processor. If the FP has capacity to buffer more than one message, then it can simply retrieve more than one message from the Applications Processor and set the delayed wake time for PPs accordingly.

By metering the time for PPs to re-awaken, the FP can effectively control the traffic flow within the network and avoid traffic peaks of PPs waking at the same time and having to contend and hence requiring to be awake for longer periods than necessary. This increases the network on-air efficiency and in addition aids the network traffic flow when there are other PPs in the network that are not long sleeping devices, as peaks in the traffic from sleeping PPs are spread out. A point to note is that the delay wake time provided to each PP by the FT must be made with respect to the latency required by the application. The time required for the FP to instruct the PP to wake after a set time, for the FP to receive the message from the Applications Processor, the wait time and then the delivery of the message in practice can be in terms of milliseconds. Hence the latency of this system can be controlled within practical requirements. In the case that the message traffic grows, the latency gracefully extends.

It is assumed that messages 45, 49, 51 and 53 that are aimed to wireless communication device PP A and PPB are much longer than control messages 40, 41, 43, 44, 46, 47, 48, 50 and 52. The control messages are also referred to as notifications or indications. Messages 45, 49, 51 and 53 can be any combination of bits, bytes or symbols.

Figure 4:
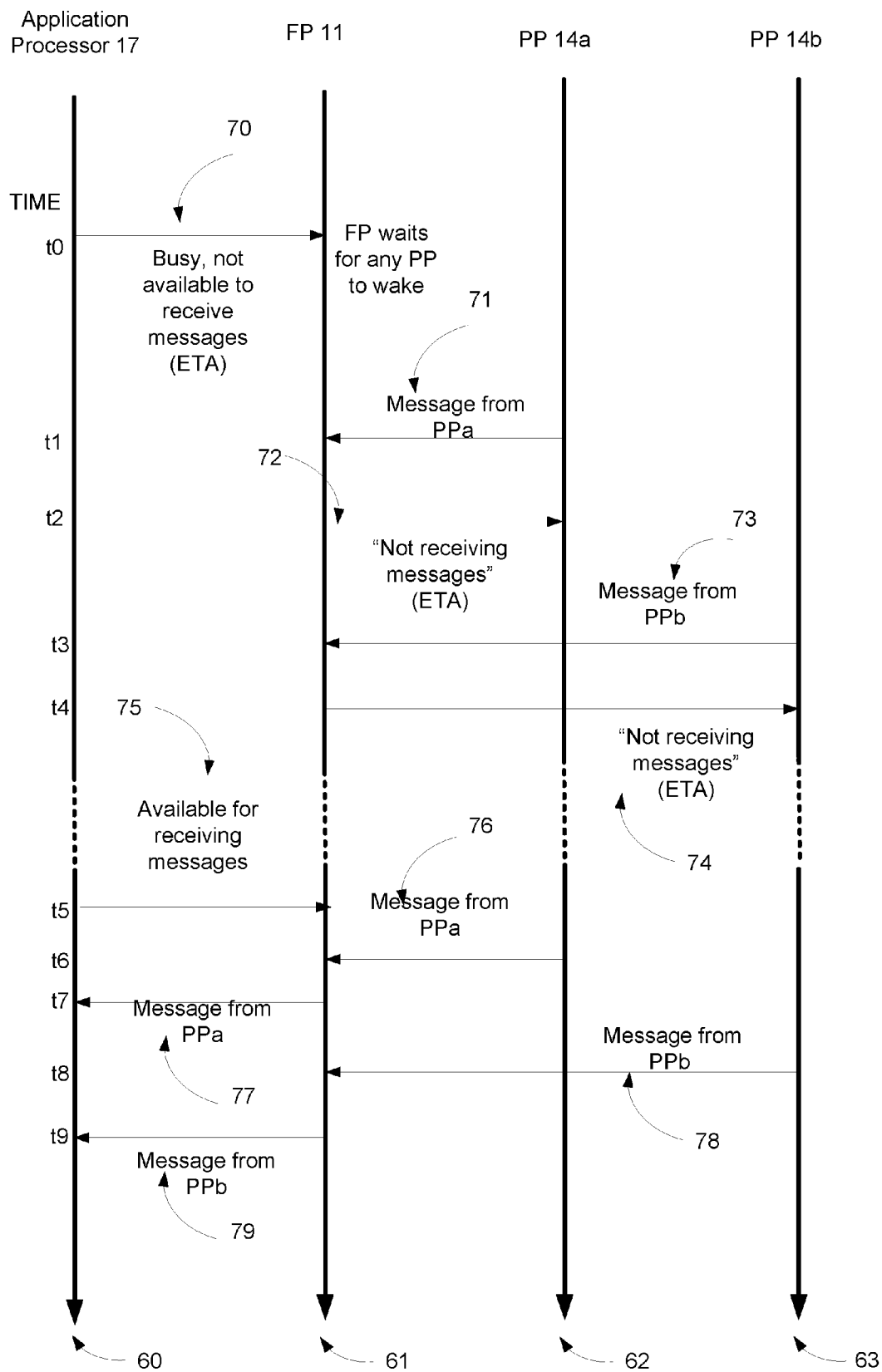
FIG. 4 is a time diagram of the interchanges between the application, the FP and two PPs according to an embodiment of the invention.

FIG. 4 is a time line diagram that illustrates the steps when the application processor 17 wishes to indicate that it cannot accept any messages from PPs, via the FP 11. In this example time line, two PPs are shown, 14a and 14b. In FIG. 4 the time axis for the Application Processor 17, the FP 11, PP 14a and PP 14b are 60, 61, 62 and 63 respectively. The specific time points referred to in this description are shown on the Application Processor time line 60.

At time t0, the application processor 17 sends a control message 70 to the FP 11 that informs the FP that the application processor is unable to accept any messages. Included in this message may be an indication of when the application processor may be available for messages.

This indication, termed "estimated time of availability" or ETA, could be in the form of an absolute time or in a relative time.

When, at time t1, a PP 14a, sends a message 71 to the FP 11, the FP responds at time t2 with a control message 72 that indicates that it is unable to accept the message. This response 72 could be a 'busy' indication but also could include the ETA information that had been provided by the application processor in control message 70.

If the ETA is in the form of an absolute time then this time can be forwarded to the PP 14a, or if the ETA is in the form of a relative time, then the ETA provided by the FP 11 to the PP 14a in message 72 would be adjusted to account for the time delay between messages 70 and 72.

At time t3, a PP 14b, sends a message 73 to the FP 11, and the FP responds at time t4 with a control message 74 that indicates that it is unable to accept the message.

As before, this response 74 could be a 'busy' indication but also could include the ETA information that had been provided by the application processor in message 70.

If the ETA is in the form of an absolute time then this time may be forwarded to the PP 14b, or if the ETA is in the form of a relative time, then the ETA provided by the FP 11 to the PP 14a in control message 72 would be adjusted to account for the time delay between control messages 70 and 74.

In addition, as the FP 11 has already informed PP 14a of the ETA then the FP 11 may add a time period to the ETA that it conveys to PP 14b such that the time that the PP 14b will again try to convey its message would not conflict with the expected message from PP 14a.

At time t5, the application processor 17 is available for accepting messages and sends control message 75 to the FP 11. If the application processor had indicated an ETA in message 70 at time t0, then time t5 would correspond to the elapsed time between times t0 and t5.

At time t6, PP 14a sends its message 76 to the FP 11 and the FP duly sends the message 77 onto the applications processor 17.

At time t8, PP 14b sends its message 78 to the FP 11 and the FP duly sends the message 79 onto the applications processor 17.

The timing of the messages 76 and 78 could be based upon the ETAs that PPs 14a and 14b respectively received from the FP 11 in messages 72 and 74 respectively.

By the means described reference to FIG. 4, the application processor can indicate that it is unable to receive messages but is able to provide an indication of when in the future it will be able to receive messages by use of the ETA. The FP is then able to convey the situation onto any PP that contacts the FP with a message for the application processor.

Furthermore, by informing the PP of the ETA that indicates when the application processor will be available, the PPs may sleep and save power.

In addition, the FP can adjust the ETA it provides to each PP with a message for the applications processor such that clashes are avoided again saving power and increasing on-air efficiency.

It is assumed that messages 71, 73, 76 and 78 that are aimed to upstream device are much longer than control messages 70, 72, 74, 75, 77 and 79. The control messages are also referred to as notifications or indications. Messages 71, 73, 76 and 78 can be any combination of bits, bytes or symbols.

Figure 5:
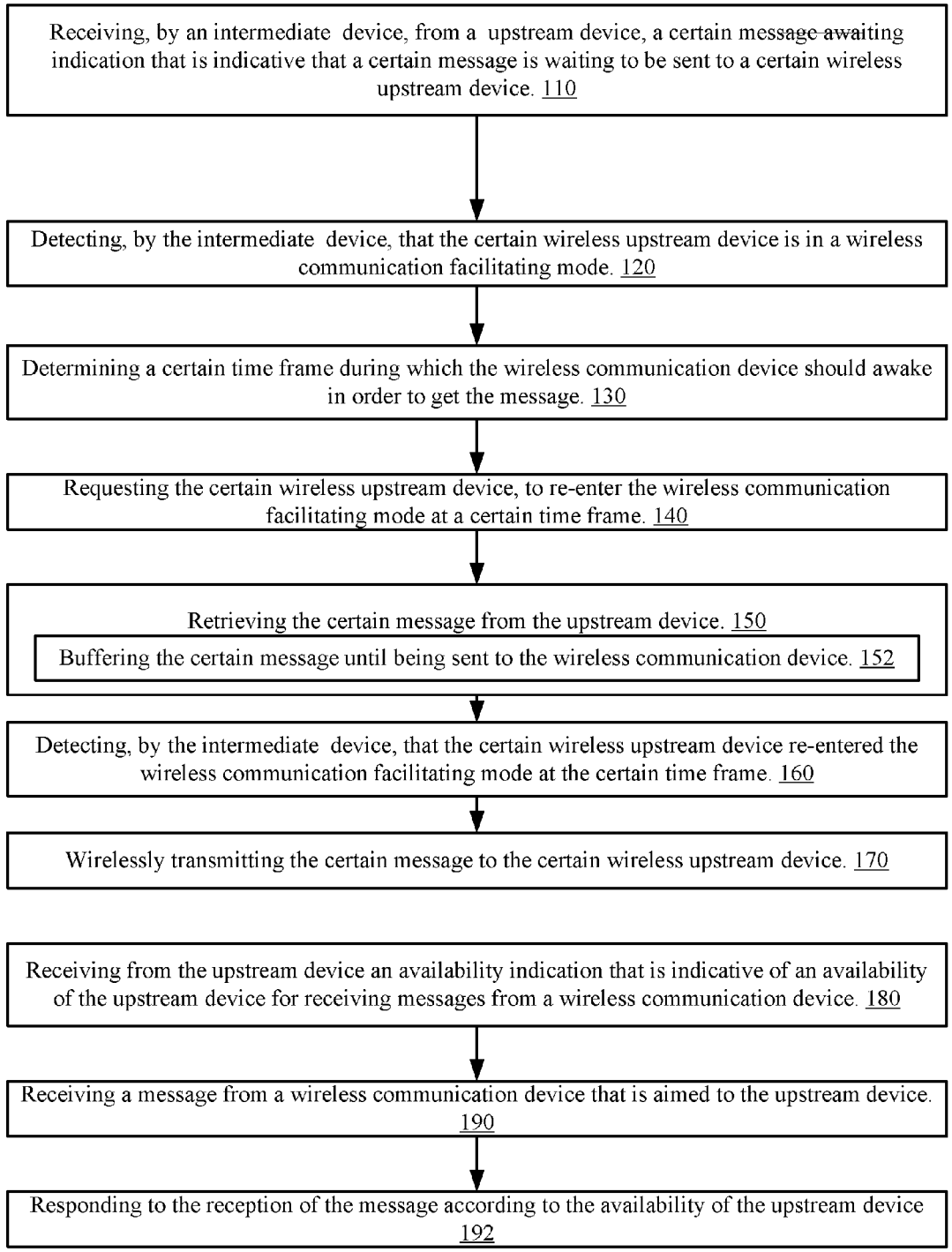
FIG. 5 illustrates a method according to an embodiment of the invention.

FIG. 5 illustrates method 100 according to an embodiment of the invention.

Method 100 is executed by an intermediate device such as an access point, a group owner, a fixed point or any type of wireless upstream device that interfaces between a wireless upstream device and an upstream device. The upstream device may be an application controller or any other source of messages it is located upstream in relation to the intermediate device and sends messages downstream via the intermediate device to PP. The intermediate device and the upstream device may be wirelessly and/or wired linked to each other.

Method 100 may start by stage 110 of receiving, by the intermediate device, from a upstream device, a certain message awaiting indication that is indicative that a certain message is waiting to be sent to a certain wireless upstream device. (See, for example, event 30 of FIG. 2).

Stage 110 may be followed by stage 120 of detecting, by the intermediate device, that the certain wireless upstream device is in a wireless communication facilitating mode. The detecting may be responsive to a transmission from the certain wireless upstream device. (See, for example, event 31 of FIG. 2).

Stage 120 may be followed by stage 130 of determining a certain time frame during which the wireless communication device should awake in order to get the message.

Stage 130 may be followed by stage 140. Stage 140 may occur at requesting point of time. Stage 130 may include calculating the certain time frame to occur after a time gap between the requesting point of time and the certain time frame. The time gap is set such as not to be shorter than an expected duration of the retrieving of the certain message from the upstream device.

Stage 130 may be followed by stage 140 of requesting the certain wireless upstream device, to re-enter the wireless communication facilitating mode at a certain time frame. (See, for example, event 32 of FIG. 2). The certain time frame may be a point in time or a time window.

Stage 140 may be followed by stage 150 of retrieving the certain message from the upstream device. (See, for example, events 33 and 34 of FIG. 2). The certain message is buffered (152) by the intermediate device until, at least, it is sent (stage 160) to the certain wireless upstream device.

Stage 150 may be followed by stage 160 of detecting, by the intermediate device, that the certain wireless upstream device re-entered the wireless communication facilitating mode at the certain time frame. (See, for example, event 35 of FIG. 2).

Stage 160 may be followed by stage 170 of wirelessly transmitting the certain message to the certain wireless upstream device. (See, for example, event 36 of FIG. 2).

While stages 110-170 are associated with downstream transmission of messages from the upstream device to the wireless upstream device, method 100 may also include upstream transmission from the wireless upstream device to the upstream device.

Method 100 may include stage 180 of receiving from the upstream device an availability indication that is indicative of an availability of the upstream device for receiving messages from a wireless communication device. (See, for example, events 70 and 75 of FIG. 4).

Stage 180 may be followed by stage 190 of receiving a message from a wireless communication device that is aimed to the upstream device. (See, for example, events 71, 73, 76 and 78 of FIG. 4).

Stage 190 may be followed by stage 192 of responding to the reception of the message according to the availability of the upstream device—if it is available then sending the message to the upstream device (events 77 and 79 of FIG. 4), if it is not available—not sending the message to the upstream device and sending a non-availability message to the wireless communication device (events 72 and 74 of FIG. 4).

It is noted that although method 100 was illustrated above in relation to a single message aimed to a single wireless communication device, that method 100 can be applied to convey more than a single message to more than a single wireless communication device. For example, if multiple (M) messages are destined to be sent to the certain wireless communication device then K repetitions (K is a positive integer) of stages 130-170 may be executed, wherein K ranges between 1 and M. Additionally or alternatively, stage 150 may be used for retrieving one or more of the M messages. A single time frame can be allocated for transmitting one or more of the M messages.

Figure 6:
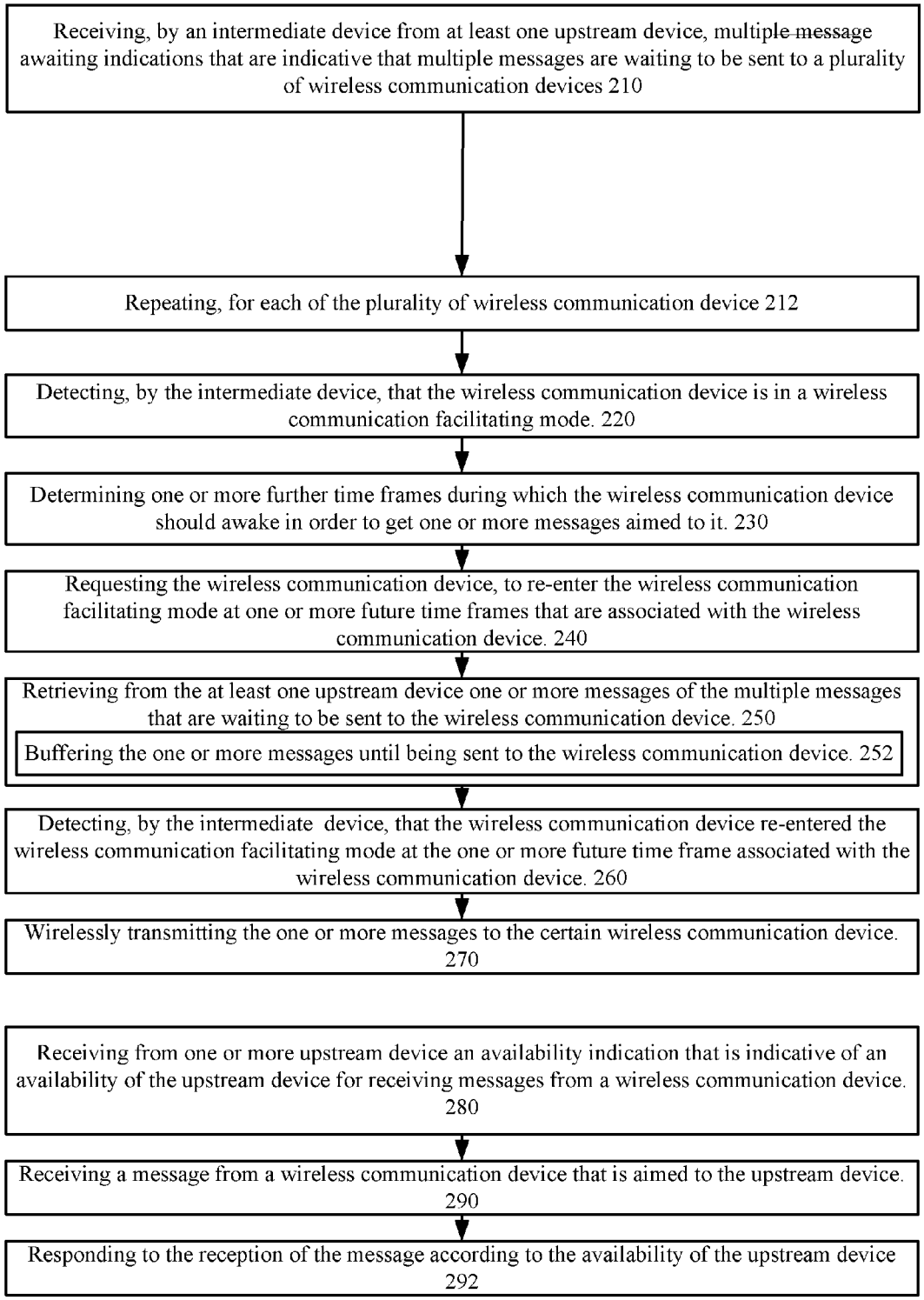
FIG. 6 illustrates a method according to an embodiment of the invention.

FIG. 6 illustrates method 200 according to an embodiment of the invention.

Method 200 differs from method 100 by managing multiple messages from a plurality of wireless communication devices.

Method 200 may start by stage 210 of receiving, by an intermediate device, from at least one upstream device, multiple message awaiting indications that are indicative that multiple messages are waiting to be sent to a plurality of wireless communication devices Stage 210 may be followed by a repeating (212), for each of the plurality of wireless communication device a sequence of stages that includes stages 220, 230, 240, 250, 260 and 270.

Stage 220 may include detecting, by the intermediate device that the wireless communication device is in a wireless communication facilitating mode.

Stage 220 may be followed by stage 230 of determining one or more further time frames during which the wireless communication device should awake in order to get one or more messages aimed to it.

Stage 230 may be followed by stage 240.

Stage 240 may include requesting the wireless communication device, to re-enter the wireless communication facilitating mode at one or more future time frames that are associated with the wireless communication device.

Stage 230 may include calculating the certain time frame to occur after a time gap between the requesting point of time and the certain time frame. The time gap is set such as not to be shorter than an expected duration of the retrieving of the certain message from the upstream device.

Method 200 may include controlling the awakening periods of different wireless communication devices and may include controlling the timing of message transmissions to different wireless communication devices. Stage 230, when applied to different wireless communication devices, can set different time frames to different wireless communication devices. The different time frames may be non-overlapping or at least partially overlapping.

Stage 230 may include applying a traffic flow control rule to determine the association between time frames and wireless communication devices. The association between time frames and wireless communication devices may be responsive to a traffic balancing scheme. For example—the time frames may be allocated so as to prevent peaks in the traffic (of messages to the wireless communication devices), to reduce the traffic below a certain traffic threshold. The allocation may reduce the number of messages to be transmitted over a predefined period to one or more wireless communication devices.

Additionally or alternatively, method 200 may monitor the size of messages sent to the different wireless communication devices and may estimate the expected size of messages destined to the different wireless communication devices and in response to this estimation may allocate the time frames. For example, if a first wireless communication device repetitively receives larger messages than a second wireless communication device then the second wireless communication device may be allocated with more time periods or at least time periods that are closer to each other than those allocated to the first wireless communication device. Yet for another example—the method may include detecting message size patterns and once detected such message size patterns (sizes of consecutive messages sent to the same wireless communication device) estimating sizes of future messages and taking this into account when scheduling future time frames.

Stage 250 may include retrieving from the at least one upstream device one or more messages of the multiple messages that are waiting to be sent to the wireless communication device. The one or more messages are buffered (stage 252) until being sent to the wireless communication device.

Stage 260 may include detecting, by the intermediate device, that the wireless communication device re-entered the wireless communication facilitating mode at the one or more future time frame associated with the wireless communication device.

Stage 270 may include wirelessly transmitting the one or more messages to the certain wireless communication device.

At least one future time frame is utilized for transmitting a single message to a single wireless communication device. Alternatively, at least one future time frame is utilized for transmitting more than a single message to a single wireless communication device.

While stages 210-270 are associated with downstream transmission of messages from the upstream device to the wireless upstream device, method 200 may also include upstream transmission from the wireless upstream device to the upstream device.

Method 200 may include stage 280 of receiving from one or more upstream device an availability indication that is indicative of an availability of the upstream device for receiving messages from a wireless communication device. (See, for example, events 70 and 75 of FIG. 4).

Stage 280 may be followed by stage 290 of receiving a message from a wireless communication device that is aimed to the upstream device. (See, for example, events 71, 73, 76 and 78 of FIG. 4).

Stage 290 may be followed by stage 292 of responding to the reception of the message according to the availability of the upstream device—if it is available then sending the message to the upstream device (events 77 and 79 of FIG. 4), if it is not available—not sending the message to the upstream device and sending a non-availability message to the wireless communication device (events 72 and 74 of FIG. 4).

While the above descriptions contain many specifics, these should not be construed as limitations on the scope, but rather as an exemplification of one or several embodiments thereof. Many other variations are possible. Accordingly, the scope should be determined not by the embodiments illustrated, but by the appended claims and their legal equivalents.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may cause the storage system to allocate disk drives to disk drive groups.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A method for transferring messages to a wireless communication device, the method comprises:
   receiving, by an intermediate device, from an upstream device, a certain message awaiting indication that is indicative that a certain message is waiting to be sent to a certain wireless communication device;
   storing, in the intermediate device, the certain message awaiting indication without sending the certain message awaiting indication to the certain wireless communication device, and without buffering, in the intermediate device, the certain message;
   detecting, by the intermediate device, that the certain wireless communication device is in a wireless communication facilitating mode;

requesting, after detecting that the certain wireless communication device is in the wireless communication facilitating mode, the certain wireless communication device, to re-enter the wireless communication facilitating mode at a certain time frame;

retrieving the certain message from the upstream device only after the requesting of the certain wireless communication device to re-enter the wireless communication facilitating mode at the certain time frame;

detecting, by the intermediate device, that the certain wireless communication device re-entered the wireless communication facilitating mode at the certain time frame; and wirelessly transmitting the certain message to the certain wireless communication device.

2. The method according to claim 1 wherein the intermediate device is an access point or a group owner and wherein the upstream device is an application controller.

3. The method according to claim 1 wherein the intermediate device is a Digital Enhanced Cordless Telecommunication Ultra Low Energy (DECT ULE) base station.

4. The method according to claim 1 wherein the intermediate device is a Digital Enhanced Cordless Telecommunication (DECT) base station.

5. The method according to claim 1 wherein the requesting of the certain wireless communication device to re-enter the wireless communication facilitating mode occurs at a requesting point of time;

wherein the method comprises determining the certain time frame so that the certain time frame starts after a point of time that equals a sum of the requesting point of time and an expected duration of the retrieving of the certain message from the upstream device.

6. The method according to claim 1 further comprising receiving from the upstream device an availability indication that is indicative of a time period during which the upstream device is available for receiving messages from a wireless communication device; and sending, to the certain wireless communication device, information about an availability of the upstream device.

7. The method according to claim 1 comprising determining the certain time frame such as not to overlap with another time frame associated with a re-entry of another wireless communication device to the wireless communication facilitating mode.

8. The method according to claim 1 comprising determining the certain time frame based on an actual or expected traffic load on a network that comprises the certain wireless communication device.

9. The method according to claim 1 comprising storing at any point in time and by the intermediate device only up to a single message aimed to the certain wireless communication device.

10. A non-transitory computer readable medium that stores instructions that once executed by an intermediate device cause the intermediate device to:

receive from an upstream device, a certain message awaiting indication that is indicative that a certain message is waiting to be sent to a certain wireless communication device;

store, in the intermediate device, the certain message awaiting indication without sending the certain message awaiting indication to the certain wireless communication device, and without buffering, in the intermediate device, the certain message;

detect that the certain wireless communication device is in a wireless communication facilitating mode;

request, after detecting that the certain wireless communication device is in the wireless communication facilitating mode, the wireless communication device to re-enter the wireless communication facilitating mode at a certain time frame;

retrieve the certain message from the upstream device only after the request to the certain wireless communication device to re-enter the wireless communication facilitating mode at the certain time frame;

detect that the certain wireless communication device re-entered the wireless communication facilitating mode at the certain time frame; and wirelessly transmit the certain message to the certain wireless communication device.

11. The non-transitory computer readable medium according to claim 10 wherein the requesting of the certain wireless communication device to re-enter the wireless communication facilitating mode occurs at a requesting point of time; wherein the non-transitory computer readable medium stores instructions that once executed by the intermediate device cause the intermediate device to determine the certain time frame so that the certain time frame starts after a point of time that equals a sum of the requesting point of time and an expected duration of the retrieving of the certain message from the upstream device.

12. The non-transitory computer readable medium according to claim 10 that stores instructions that once executed by the intermediate device cause the intermediate device to receive from the upstream device an availability indication that is indicative of a time period during which the upstream device is available for receiving messages from a wireless communication device; and send, to the certain wireless communication device, information about an availability of the upstream device.

13. The non-transitory computer readable medium according to claim 10 that stores instructions that once executed by the intermediate device cause the intermediate device to determine the certain time frame such as not to overlap with another time frame associated with a re-entry of another wireless communication device to the wireless communication facilitating mode.

14. The non-transitory computer readable medium according to claim 10 that stores instructions that once executed by the intermediate device cause the intermediate device to determine the certain time frame based on an actual or expected traffic load on a network that comprises the certain wireless communication device.

15. An intermediate device, comprising:
a communication interface; and
a controller;
wherein the interface is arranged to receive, from an upstream device, a certain message awaiting indication that is indicative that a certain message is waiting to be sent to a certain wireless communication device;

wherein the intermediate device is configured to store the certain message awaiting indication without sending the certain message awaiting indication to the certain wireless communication device, and without buffering the certain message;

wherein the controller is arranged to detect that the certain wireless communication device is in a wireless communication facilitating mode;

wherein the interface is arranged to request, after detecting that the certain wireless communication device is in the wireless communication facilitating mode, the certain wireless communication device, to re-enter the wireless communication facilitating mode at a certain time frame and to retrieve, only after the request to the certain wireless communication device to re-enter the wireless communication facilitating mode at the certain time frame, the certain message from the upstream device;

wherein the controller is arranged to detect that the certain wireless communication device re-entered the wireless communication facilitating mode at the certain time frame; and wherein the interface is arranged to wirelessly transmit the certain message to the certain wireless communication device.

16. The intermediate device according to claim 15 wherein the intermediate device is an access point or a group owner and wherein the upstream device is an application controller.

17. The intermediate device according to claim 15 wherein the intermediate device is a Digital Enhanced Cordless Telecommunication Ultra Low Energy (DECT ULE) base station.

18. The intermediate device according to claim 15 wherein the intermediate device is a Digital Enhanced Cordless Telecommunication (DECT) base station.

19. The intermediate device according to claim 15 wherein the controller is arranged to (a) request, at a requesting point of time, the certain wireless communication device to re-enter the wireless communication facilitating mode; and (b) determine the certain time frame so that the certain time frame starts after a point of time that equals a sum of the requesting point of time and an expected duration of the retrieving of the certain message from the upstream device.

20. The intermediate device according to claim 15 wherein the communication interface is arranged to receive from the upstream device an availability indication that is indicative of a time period during which the upstream device is available for receiving messages from a wireless communication device; and to send, to the certain wireless communication device, information about an availability of the upstream device.

21. The intermediate device according to claim 15 wherein the controller is arranged to determine the certain time frame such as not to overlap with another time frame associated with a re-entry of another wireless communication device to the wireless communication facilitating mode.

22. The intermediate device according to claim 15 wherein the controller is arranged to determine the certain time frame based on an actual or expected traffic load on a network that comprises the certain wireless communication device.

* * * * *